United States Patent
Mettler

(10) Patent No.: US 10,662,042 B2
(45) Date of Patent: May 26, 2020

(54) PORTABLE RUMBLE STRIP RETRIEVAL SYSTEM

(71) Applicant: Plastic Safety Systems, Inc., Cleveland, OH (US)

(72) Inventor: Charles M. Mettler, Perry, OH (US)

(73) Assignee: Plastic Safety Systems, Inc., Cleveland, OH (US)

( * ) Notice: Subject to any disclaimer, the term of this patent is extended or adjusted under 35 U.S.C. 154(b) by 0 days.

(21) Appl. No.: 15/965,176

(22) Filed: Apr. 27, 2018

(65) Prior Publication Data
US 2019/0241412 A1    Aug. 8, 2019

Related U.S. Application Data

(60) Provisional application No. 62/470,218, filed on Mar. 11, 2017.

(51) Int. Cl.
| | |
|---|---|
| *E01F 9/70* | (2016.01) |
| *B66D 3/20* | (2006.01) |
| *B65H 1/04* | (2006.01) |
| *B60P 1/52* | (2006.01) |
| *E01F 9/529* | (2016.01) |

(52) U.S. Cl.
CPC ............... *B66D 3/20* (2013.01); *B60P 1/52* (2013.01); *B65H 1/04* (2013.01); *E01F 9/70* (2016.02); *E01F 9/529* (2016.02)

(58) Field of Classification Search
CPC .. F16G 17/00; B66C 1/42; B66C 1/34; B66C 1/22; B66C 1/66; B66C 1/36; B60P 1/14; B60P 1/36; B60P 1/52; B65H 1/04; E01F 9/529
See application file for complete search history.

(56) References Cited

U.S. PATENT DOCUMENTS

| | | | | |
|---|---|---|---|---|
| 3,531,149 A | * | 9/1970 | Klueber | B66C 1/66 294/89 |
| 7,469,881 B2 | * | 12/2008 | Alipour | B66C 1/10 254/272 |
| 8,991,883 B1 | * | 3/2015 | Butterfield, IV | B66C 1/66 294/67.3 |
| 2003/0086778 A1 | * | 5/2003 | Smith | B60P 3/07 414/500 |

(Continued)

FOREIGN PATENT DOCUMENTS

WO    WO-2017039289 A1 *  3/2017  ............... B66C 1/62

*Primary Examiner* — Kaitlin S Joerger
(74) *Attorney, Agent, or Firm* — Renner, Otto, Boisselle & Sklar, LLP

(57) ABSTRACT

A system for retrieving a portable rumble strip from a roadway includes a carrier mountable to a vehicle for transporting retrieved portable rumble strips and a winch mountable to the carrier. The carrier has a support surface configured to support a rumble strip. And the winch includes a rotatable drum and a lead with a major dimension being a length dimension. A proximal end of the lead is connected to the drum such that rotation of the drum winds the lead about the drum. A hook is connected to a distal end of the lead opposite the proximal end. The hook is configured to engage and hold a portable rumble strip as the drum rotates to draw the lead and the hook to the winch, thereby drawing the engaged portable rumble strip into the carrier.

15 Claims, 18 Drawing Sheets

(56) References Cited

U.S. PATENT DOCUMENTS

2013/0051960 A1* 2/2013 Cox, Jr. ................ B60P 3/1033
                                                                                                                       414/462
2017/0282779 A1* 10/2017 Mettler ................... B60P 3/40

* cited by examiner

PORTABLE RUMBLE STRIP RETRIEVAL SYSTEM

RELATED APPLICATIONS

This application claims priority to U.S. Provisional Patent Application No. 62/470,218 filed Mar. 11, 2017, which is hereby incorporated herein by reference.

FIELD OF THE INVENTION

This invention relates generally to a portable rumble strip retrieval system and method for retrieving portable rumble strips from a roadway with reduced effort.

BACKGROUND

Roadway warning devices, specifically the roadway warning devices commonly referred to as rumble strips, provide a perceptible noise and warning vibration when automotive vehicles, including both passenger vehicles and trucks, drive over the rumble strips. The noise and vibration is intended to warn the vehicle driver of an approaching condition that requires a lower speed or special attention, such as a work site, construction site, slow speed zone, checkpoint, toll booth, and so on, without alarming the driver and without adversely affecting the stability of the vehicle. Some types of rumble strips are intended to be permanently installed for long-term use, while others are intended to be portable for temporary use at work zones and other applications of relatively short duration.

SUMMARY

Portable rumble strips often require multiple sections to span a lane of traffic, and each section may be relatively heavy, making it difficult for one person to lift each section without assistance. Because these portable rumble strips are temporary and often are deployed on working roadways, users must transport the rumble strips to and from the work site, quickly deploy and the rumble strips onto the roadway, and then retrieve the rumble strips from the roadway, with minimal exposure of the workers to traffic on the roadway.

The above and other benefits and advantages of retrieving portable rumble strips from the road are accomplished in accordance with the present invention by providing a retrieval system and method that employ a winch mountable on a rumble strip carrier and a hook configured to engage a rumble strip to facilitate retrieving the rumble strip by pulling the rumble strip into a rumble strip carrier. The carrier may be mounted on a vehicle and also may provide a convenient way to store the rumble strips until they are needed again. The present invention also provides an ornamental design of a winch hook for use in the system for retrieving rumble strips.

More specifically, the present invention provides a system for retrieving a portable rumble strip from a roadway may include a carrier mountable to a vehicle for transporting retrieved portable rumble strips and a winch including a motor, a rotatable drum connected to the motor, and a lead with a major dimension being a length dimension. A proximal end of the lead may be connected to the drum such that rotation of the drum winds the lead about the drum. The carrier may include a support surface and upright side walls bounding at least two opposing sides of the support surface and the winch may be mountable to a distal one of the upright side walls. The system may include a hook connected to a distal end of the lead opposite the proximal end and the hook may engage and hold the portable rumble strip as the motor rotates the drum to draw the lead and the hook to the winch. Paraphrasing the original claims, the present invention provides a system for retrieving a portable rumble strip from a roadway that includes a carrier mountable to a vehicle for transporting retrieved portable rumble strips, and a winch mountable to the carrier. The carrier has a support surface configured to support a rumble strip. And the winch includes a rotatable drum and a lead with a major dimension being a length dimension, where a proximal end of the lead is connected to the drum such that rotation of the drum winds the lead about the drum. Finally, a hook is connected to a distal end of the lead opposite the proximal end. The hook is configured to engage and hold a portable rumble strip as the drum rotates to draw the lead and the hook to the winch, and thereby draw a portable rumble strip onto the support surface of the carrier.

The system may further provide one or more of the following features: (a) the hook includes a curved portion at the distal end configured to engage the portable rumble strip; (b) the hook is connected to the lead at a proximal end of the hook opposite the distal end; (c) the hook includes angled edges on the proximal end that are inclined relative to the length dimension of the lead; (d) the hook includes upright side walls along the angled edges; (e) the hook includes a proximal portion to which the lead is attached and a distal portion adjacent the proximal portion that includes a curved portion configured to engage the rumble strip, the proximal portion and the distal portion being inclined relative to one another at a joint line transverse a length dimension of the hook that extends from the curved portion to the lead.

The system may further include a power supply connectable to the winch, and a motor connected between the power supply and the drum. A controller for controlling the winch may be provided, and the controller may be operated remotely relative to the winch.

The carrier may further include upright side walls bounding at least two opposing sides of the support surface, and a guide roller mountable to a proximate one of the upright side walls. The guide roller may include a cylindrical roller that is rotatable about an axis and has a radius at a major extent of the cylindrical roller and has laterally spaced guide walls extending beyond the major extent of the cylindrical roller to guide the lead, the hook, and the portable rumble strip over the cylindrical roller and into the carrier. The guide roller may include a single cylindrical roller. The guide walls may include outwardly flared portions and the cylindrical roller may be interposed between the outwardly flared portions and the carrier. The guide roller may include a mounting frame configured to engage portions of the carrier to support the cylindrical roller relative to the carrier.

The mounting frame for the guide roller may include at least one fastener configured to engage an upright side wall of the carrier.

The winch may include a mounting frame configured to engage portions of the carrier to support the winch relative to the carrier. The mounting frame for the winch may include at least one hook configured to engage an upright side wall of the carrier.

The present invention also provides a method of retrieving a portable rumble strip from a roadway. The method includes the steps of (a) mounting a carrier having a support surface configured to support a portable rumble strip to a vehicle; (b) mounting a winch to the carrier, the winch including a rotatable drum and a lead with a major dimension being a length dimension, a proximal end of the lead being connected to the drum such that rotation of the drum winds the lead about the drum, and a hook connected to a distal end of the lead opposite the proximal end; (c) extending the distal end of the lead and the hook; (d) engaging a portable rumble strip with the hook; and (e) retracting the lead by rotating the drum to wind the lead about the drum, pulling the hook and the engaged portable rumble strip onto the support surface.

The engaging step may include engaging a portable rumble strip having multiple segments along a length of the rumble strip, each segment connected to an adjacent segment by a hinge; and the method may further include the step of folding the portable rumble strip over the proximal one of the upright side walls of the carrier after the retracting step.

The present invention further provides a system for retrieving a portable rumble strip from a roadway. The system includes (a) means for supporting a portable rumble strip, the supporting means being mountable a vehicle; (b) means for pulling a portable rumble strip onto the supporting means, the pulling means being mountable to the supporting means; and (c) means for engaging a portable rumble strip connected to the pulling means to hold the engaged portable rumble strip as the pulling means pulls the portable rumble strip onto the supporting means.

Finally, the present invention also provides an ornamental design for a winch hook, as shown and described.

The foregoing and other features of the invention are hereinafter fully described and particularly pointed out in the claims, the following description and annexed drawings setting forth in detail a certain illustrative embodiment of the invention. The illustrated embodiment is indicative, however, of but one of the various ways in which the principles of the invention may be employed.

BRIEF DESCRIPTION OF THE DRAWINGS

In the accompanying drawings and description, the same or similar reference characters are used to refer to the same or similar features shown in different figures.

DETAILED DESCRIPTION

The above and other benefits and advantages of retrieving portable rumble strips from the road are accomplished in accordance with the present invention by providing a retrieval system and method that employ a winch mountable on a rumble strip carrier, and a hook configured to engage a rumble strip to facilitate retrieving the rumble strip by pulling the rumble strip into the rumble strip carrier. The carrier is mountable to a vehicle for transporting retrieved portable rumble strips, and also may provide a convenient way to store the rumble strips until they are needed again. The present invention also provides an ornamental design of a winch hook for use in the system for retrieving rumble strips. An exemplary embodiment of the invention has been found to allow a single person to pull an approximately 110 lb. (about 50 kg) rumble strip into the carrier in approximately ten seconds with little effort, thereby minimizing both manual exertion and worker exposure to traffic on a roadway.

Figure 1:
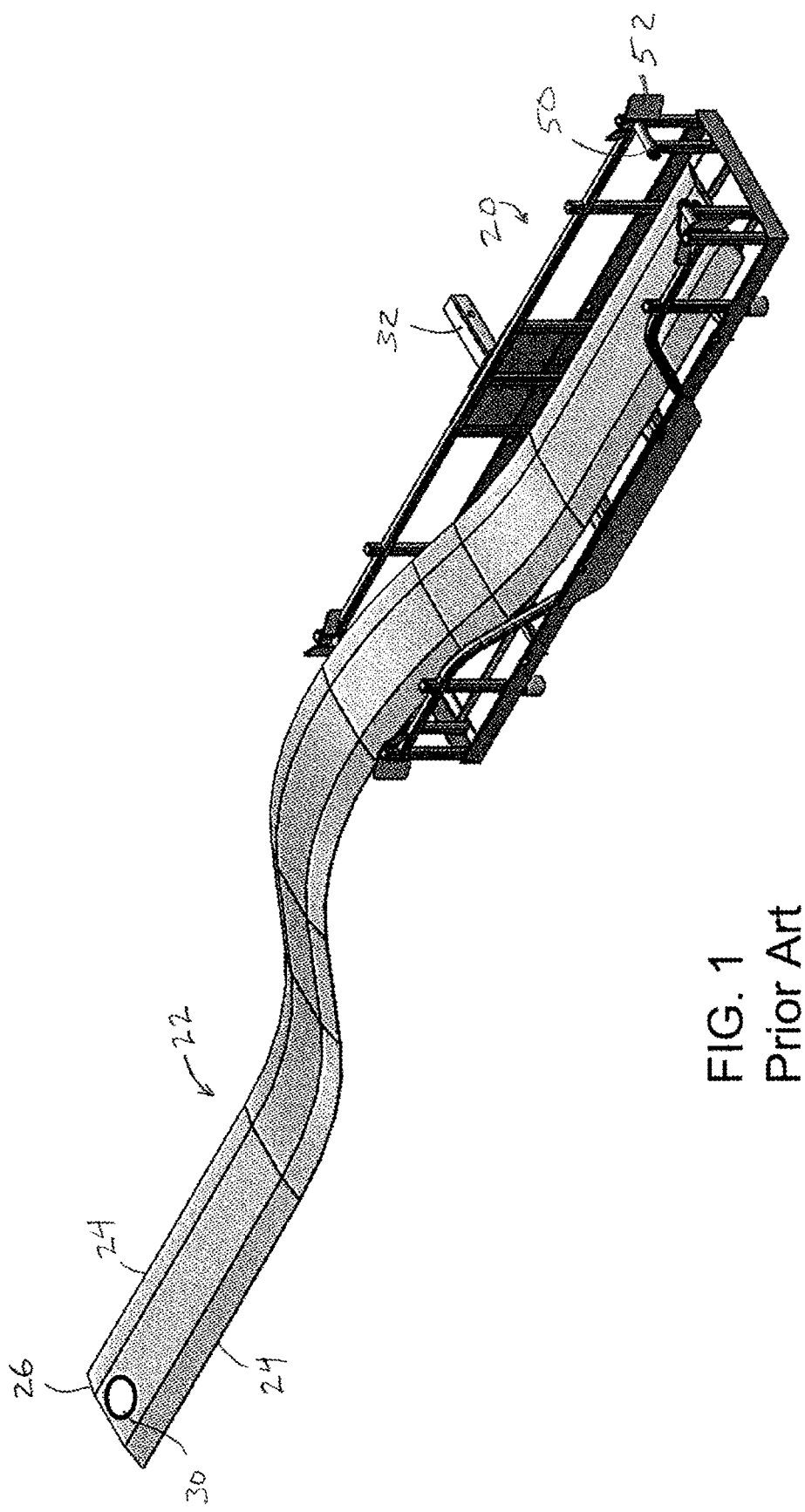
FIG. 1 is a perspective view of a prior art carrier for portable rumble strips and a schematic rumble strip.

FIG. 1: Prior Art Carrier and Schematic Rumble Strip

Referring now more particularly to the drawings, and initially to FIG. 1, which shows an exemplary known rumble strip carrier 20 and a schematic rumble strip 22 partially within the carrier 20. The rumble strip 22 has a rectangular shape with substantially flat top and bottom surfaces, relatively long opposing side edges 24, and relatively short opposing end edges 26, giving the rumble strip 22 a substantially greater length dimension than width dimension. Although the dimensions of each rumble strip 22 may vary, the rumble strip 22 desirably has sufficient length to reach across a single highway lane, which typically is about eleven feet (about 3.4 m) wide. The rumble strip 22 has a width of about eight to sixteen inches (about 20 to 41 cm). The rumble strips 22 also have sufficient thickness to create a noticeable audible and vibration warning to drivers of automotive vehicles, including trucks, when driven over the rumble strips 22, but not so severe as to alarm the drivers or cause any adverse effect on the stability of a vehicle. To that end, the rumble strip 22 generally has a thickness of about 0.5 to 1 inch (about 1.3 to 2.5 cm).

Suitable hand grip slots 30 typically are provided in each rumble strip 22 adjacent to one or both ends of the rumble strip 22. The hand grip slots 30 make it easier to pick up each rumble strip 22 so that it can be lifted or dragged in a longitudinal direction (parallel to the length dimension of the side edges 24) as it is deployed or retrieved. To facilitate deploying the rumble strips 22 in sufficient length to span the roadway while providing a more compact form for storage and transport, the rumble strips 22 may have multiple sections that are secured together end-to-end, either as they are deployed or via a previously-applied hinged connection.

Portable rumble strips 22 typically are made of a suitable high strength, weather-resistant polymeric material. Because polymeric materials alone generally are not heavy enough to hold a portable rumble strip 22 in place under heavy traffic at highway speeds, metal plates may be embedded in the rumble strip 22 to provide the necessary ballast to keep each rumble strip 22 in place. This added weight makes the rumble strip 22 heavier, however. Some rumble strips 22 may weigh as much as 110 pounds (about 50 kg) or more, which may make them more difficult for one person to deploy and retrieve from a site. Exemplary rumble strips are described in U.S. Pat. No. 7,736,087 and U.S. Patent Application Publication No. 2015/030390A1.

The carrier 20 may be mountable on a vehicle through a hitch assembly. The hitch assembly on a vehicle typically includes a sleeve or receiver securely mounted to a front end or a rear end of the vehicle to position the rumble strip carrier 20 proximate a respective front or rear bumper of the vehicle. The carrier may have a pintle 30, as shown, configured for receipt in a standard receiver of a vehicle hitch assembly. This arrangement provides convenient access to the carrier 20 for loading and unloading portable rumble strips 22.

The rumble strip carrier 20 also may be used for storing the rumble strips 22 when not in use, and the rumble strip carrier 20 may be removed from the vehicle for such purpose. A lift truck, such as a vehicle commonly referred to as a forklift, may be used to support the rumble strip carrier 20 for mounting to or removing the rumble strip carrier 20 from the hitch assembly.

Figure 2:
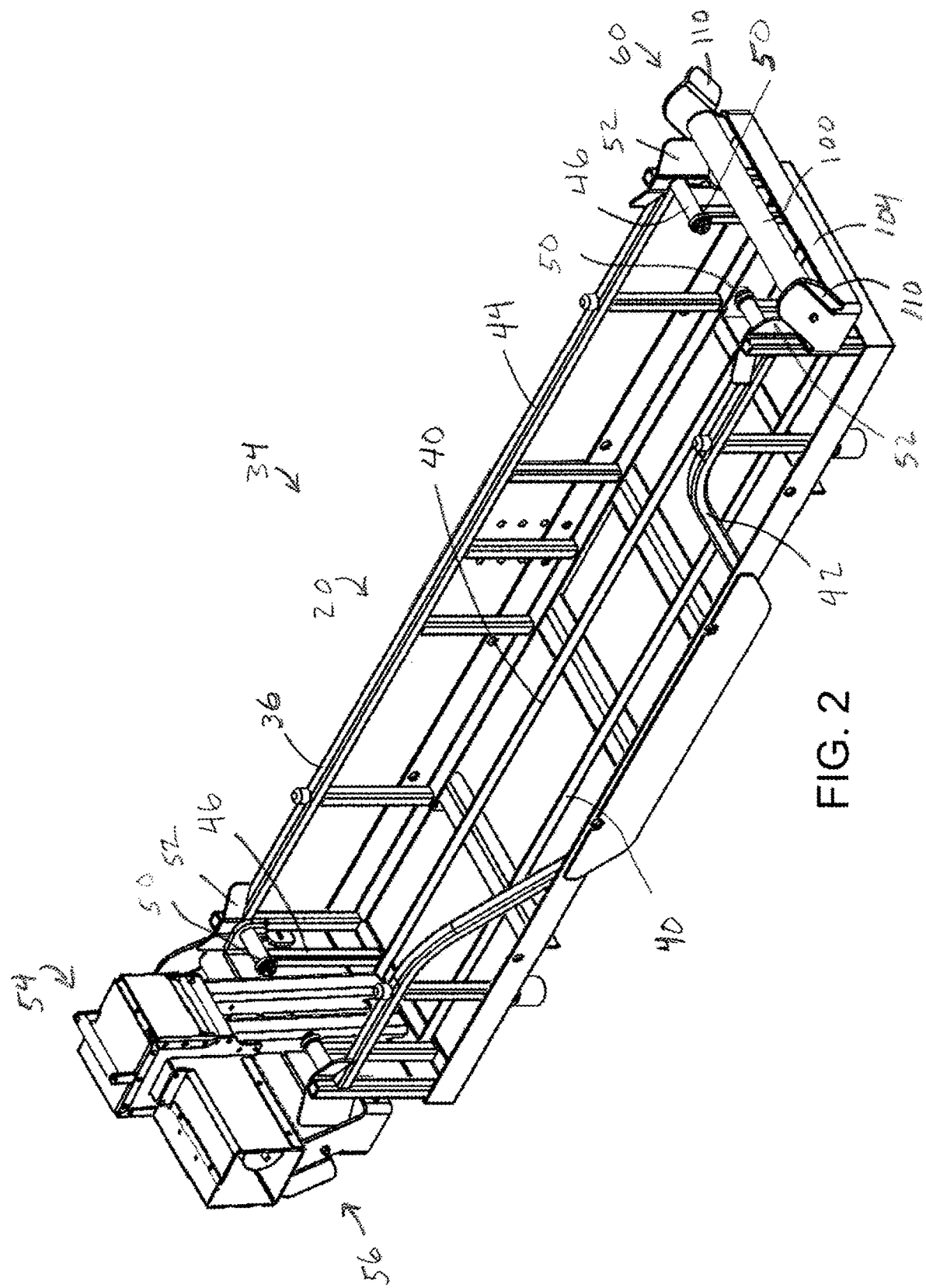
FIG. 2 is a perspective view of a portable rumble strip retrieval system provided by the present invention that includes a carrier and winch.
Figure 3:
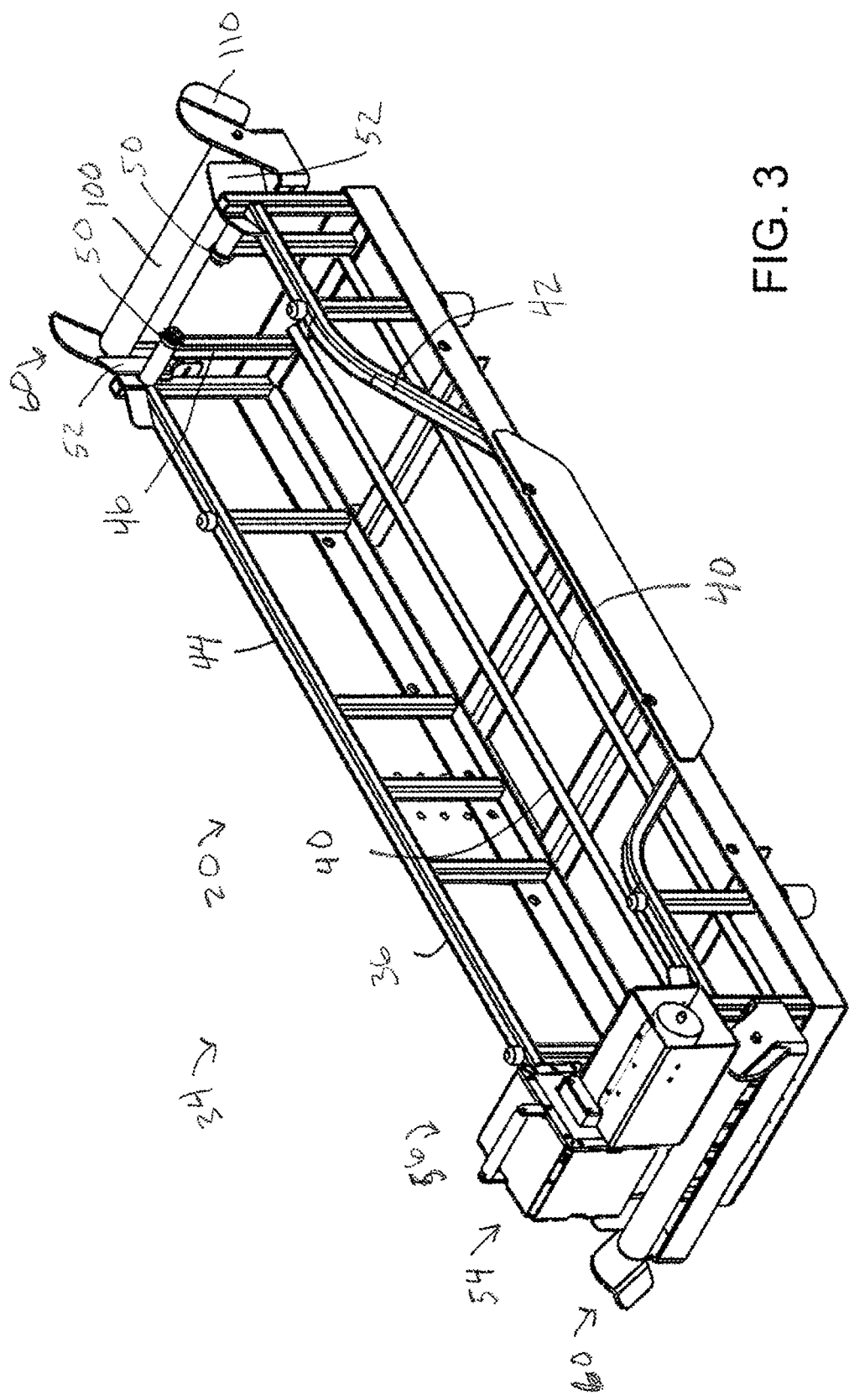
FIG. 3 is a second perspective view of the retrieval system of FIG. 2.
Figure 4:
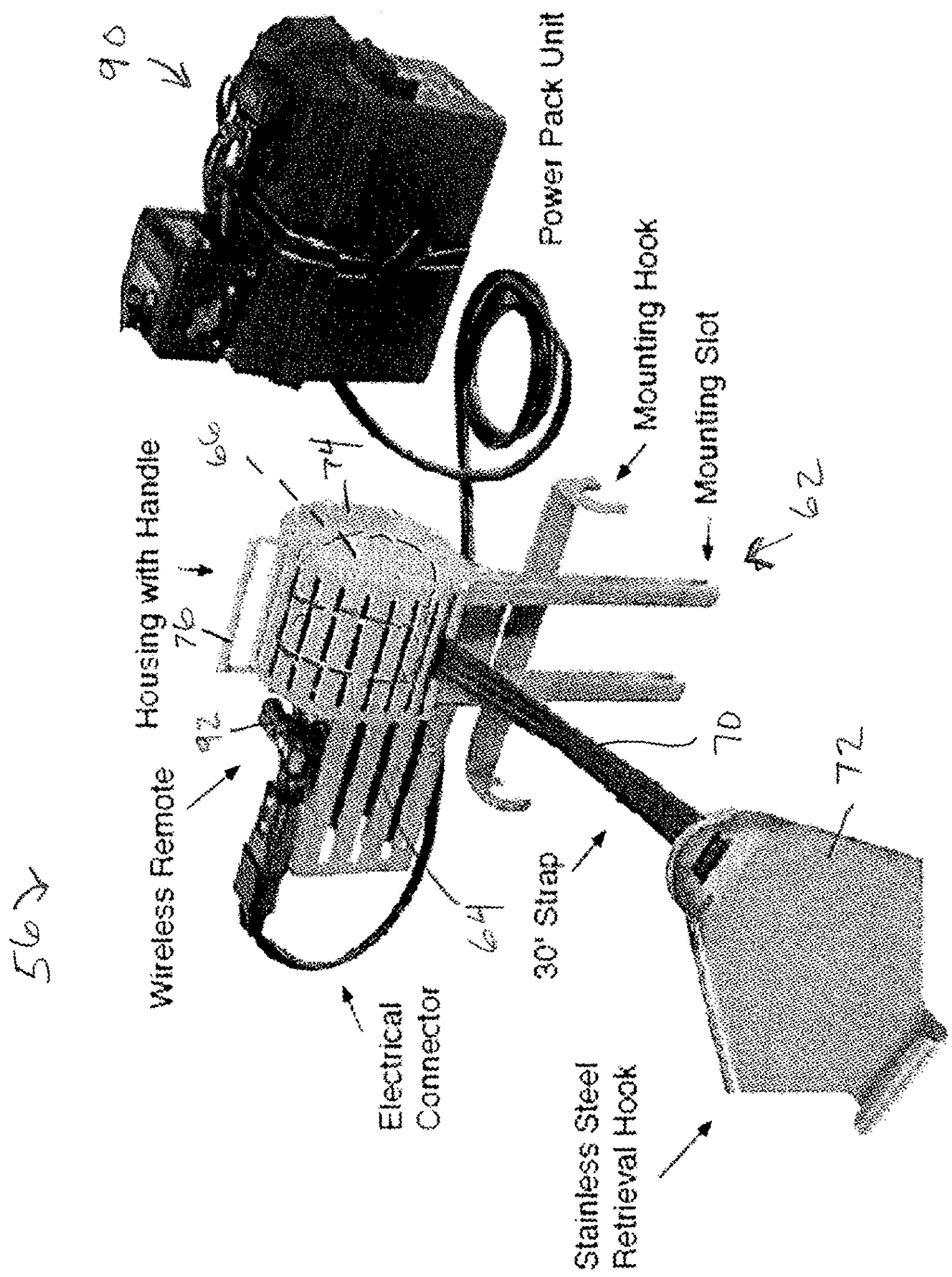
FIG. 4 is a perspective view of a winch assembly provided by the invention, including the winch of FIG. 2
Figure 5:
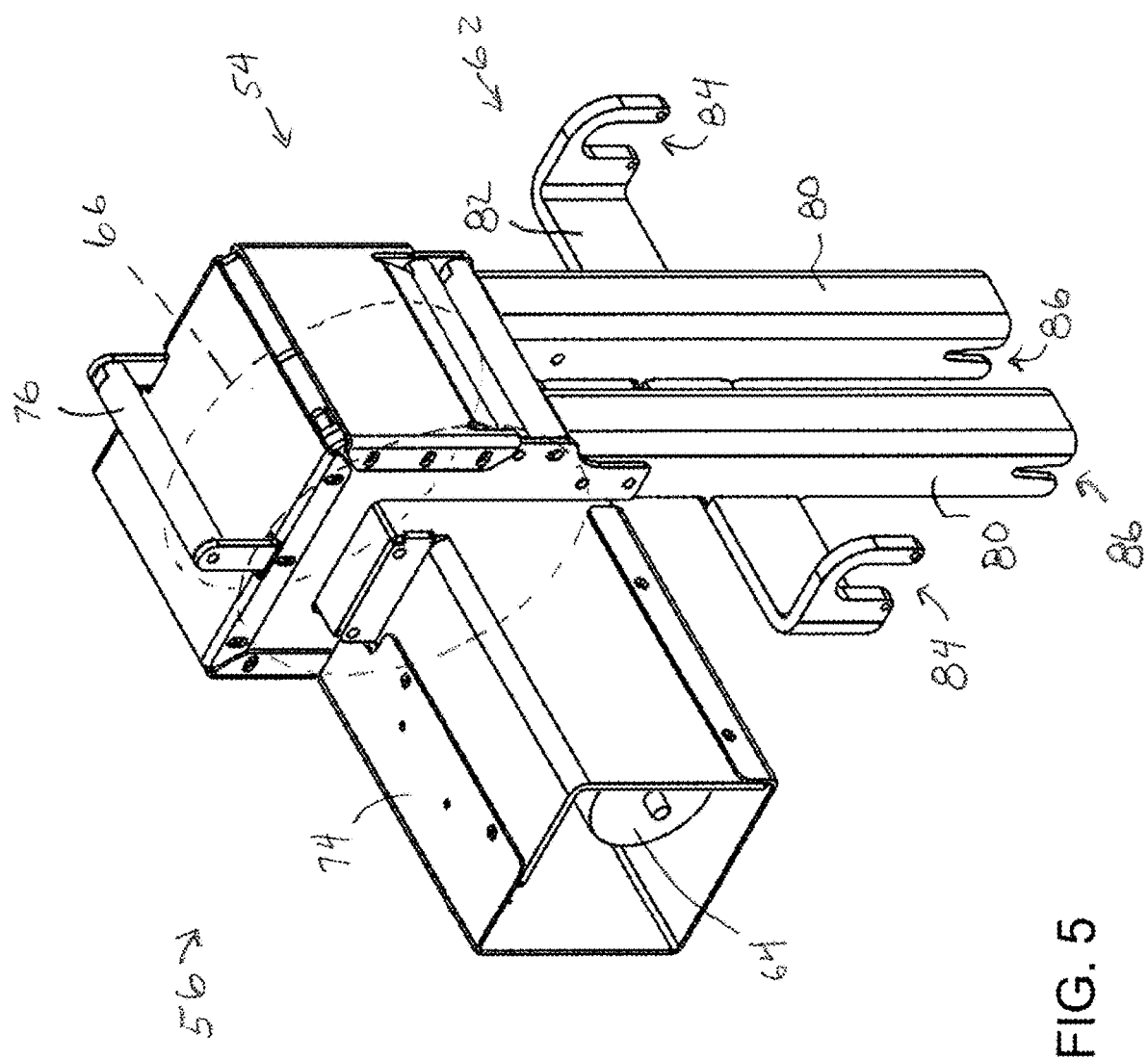
FIG. 5 is a perspective view of the winch of FIG. 2.
Figure 6:
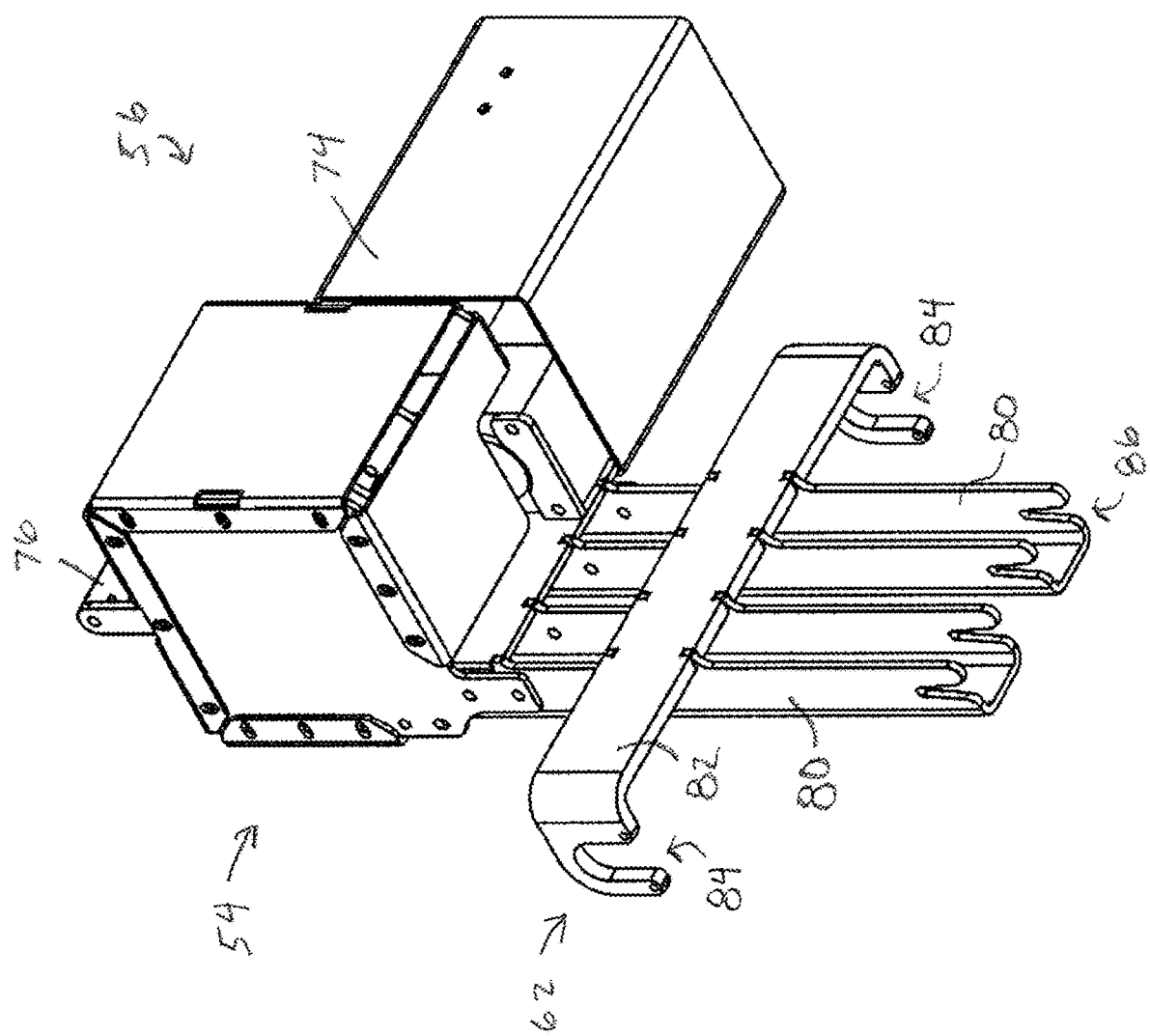
FIG. 6 is another perspective view of the winch of FIG. 5.
Figure 7:
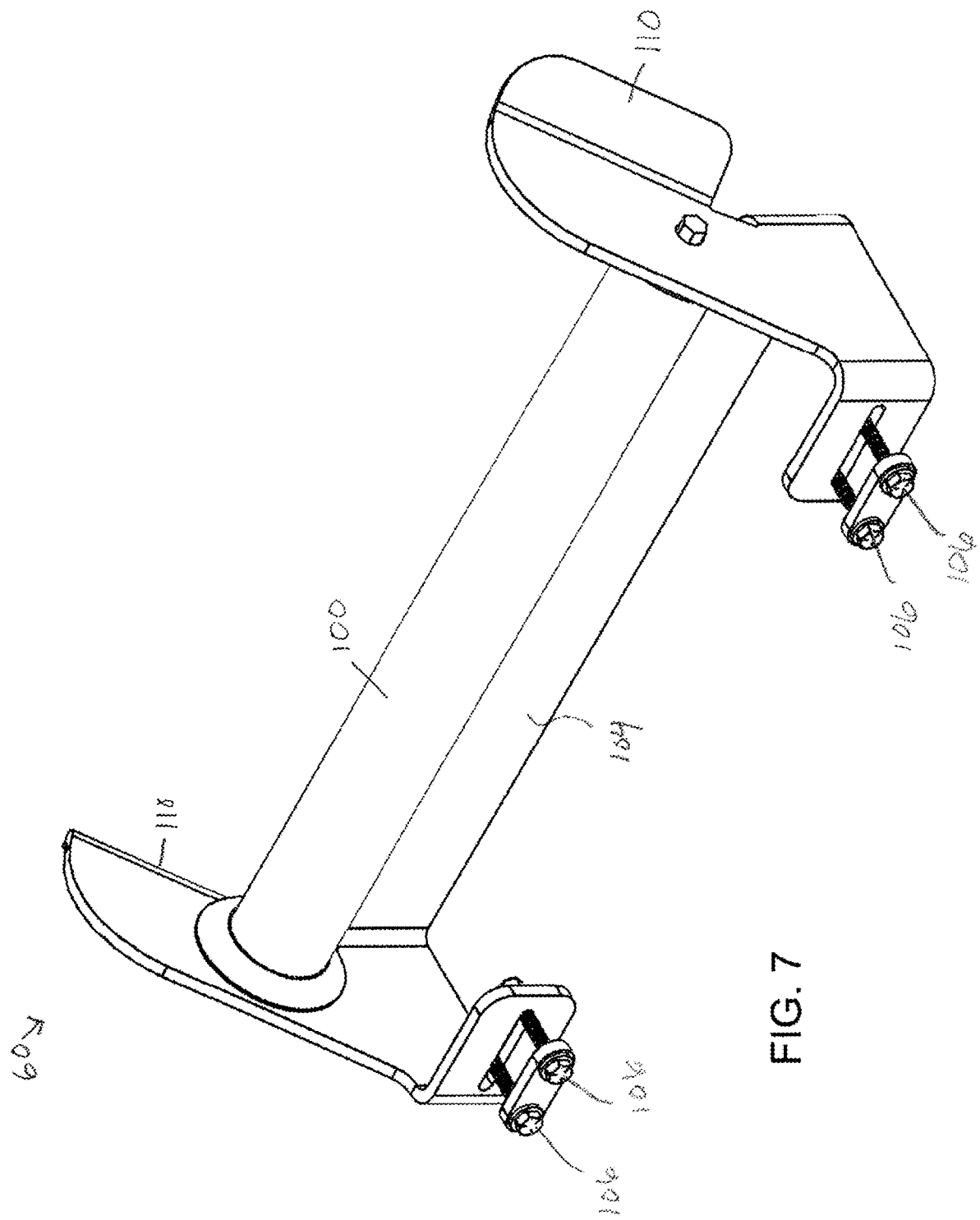
FIG. 7 is an enlarged perspective view of a guide roller of the retrieval system of FIG. 2.
Figure 8:
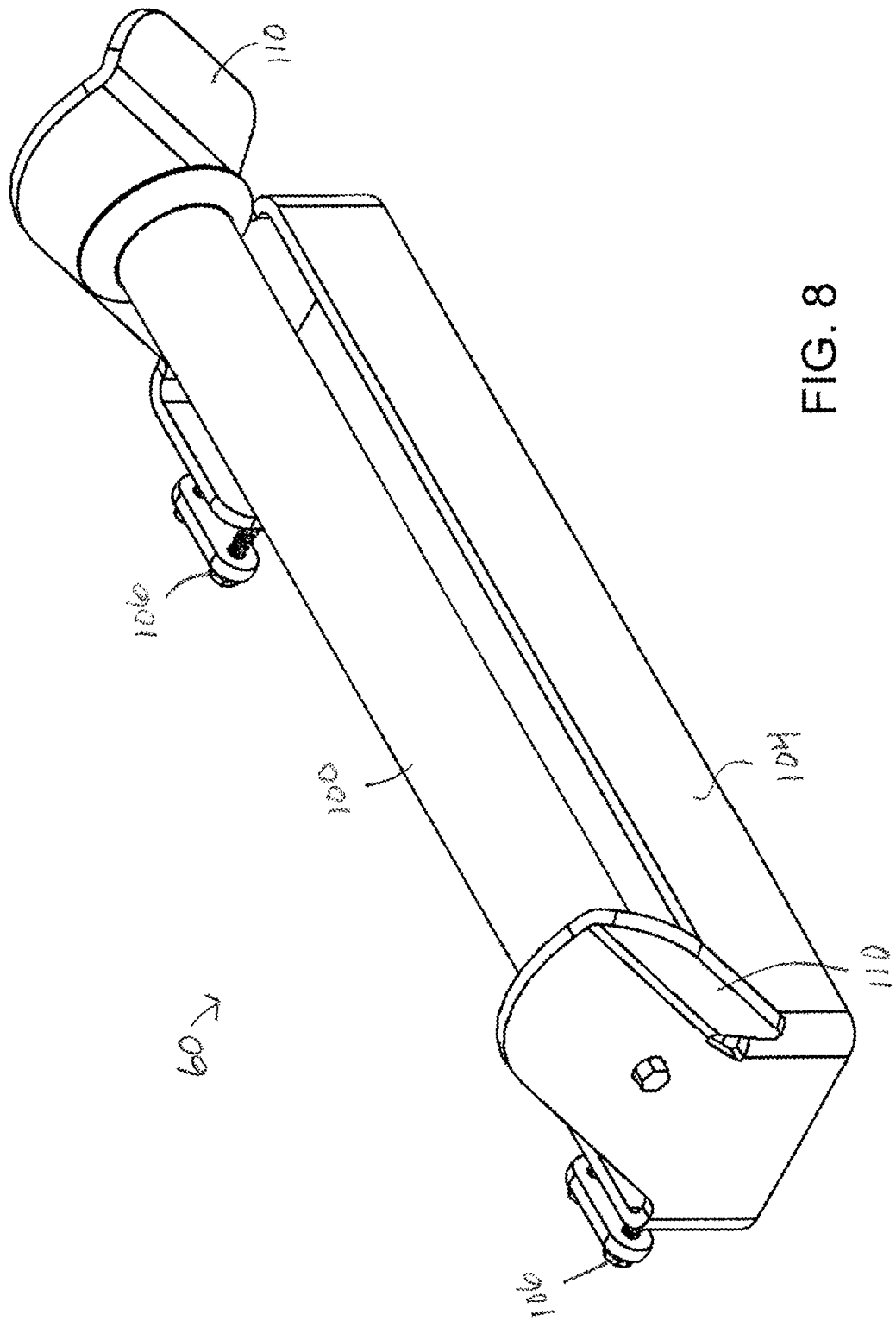
FIG. 8 is another perspective view of the guide roller of FIG. 7.
Figure 9:
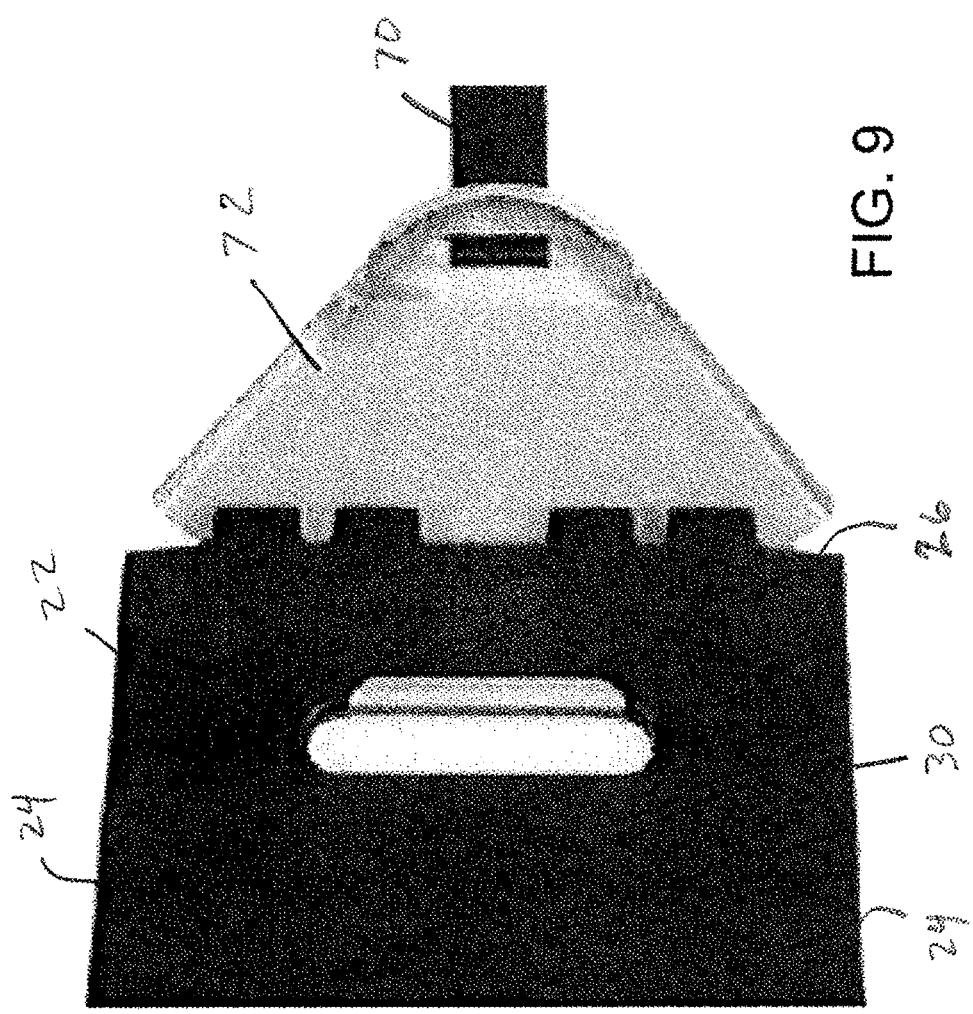
FIG. 9 is a plan view of a winch hook provided in accordance with the invention in engagement with a portable rumble strip.
Figure 10:
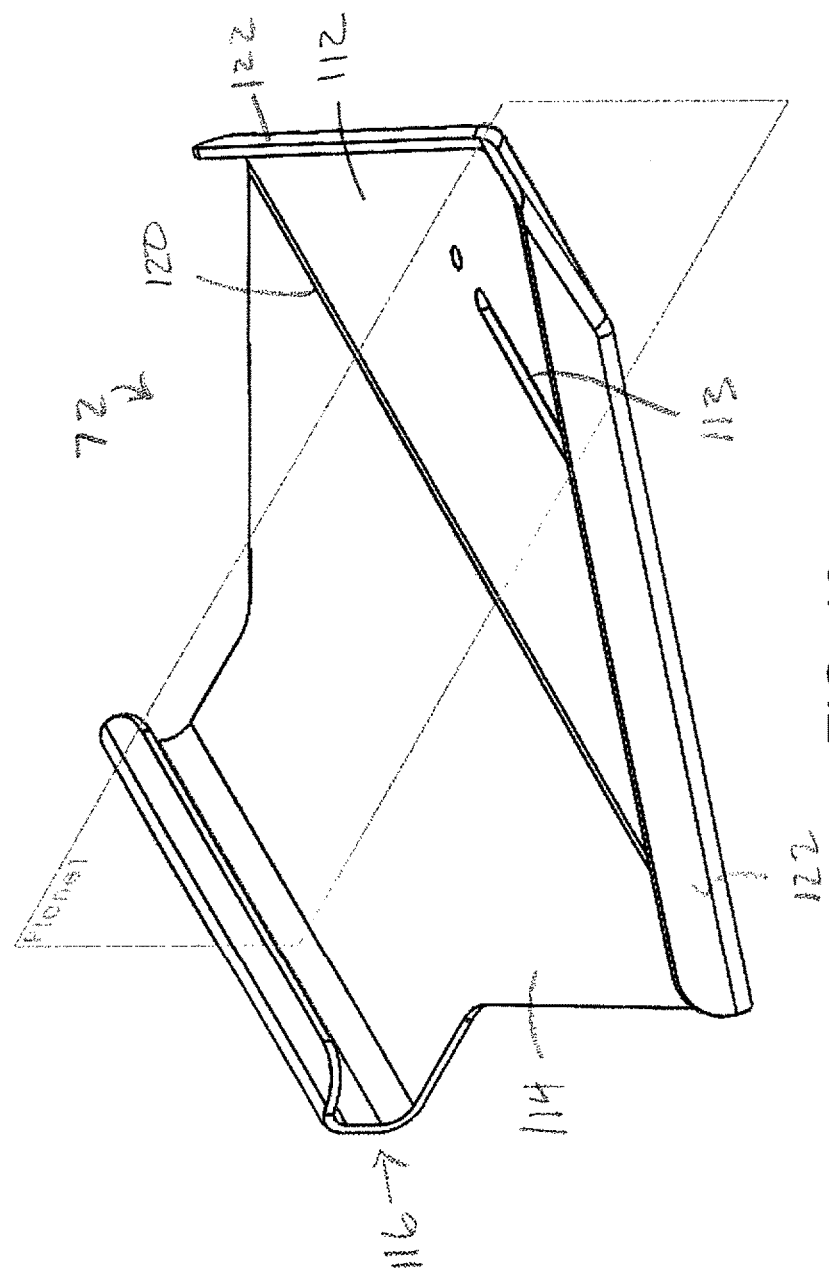
FIG. 10 is a first perspective view of the winch hook of FIG. 9.
Figure 11:
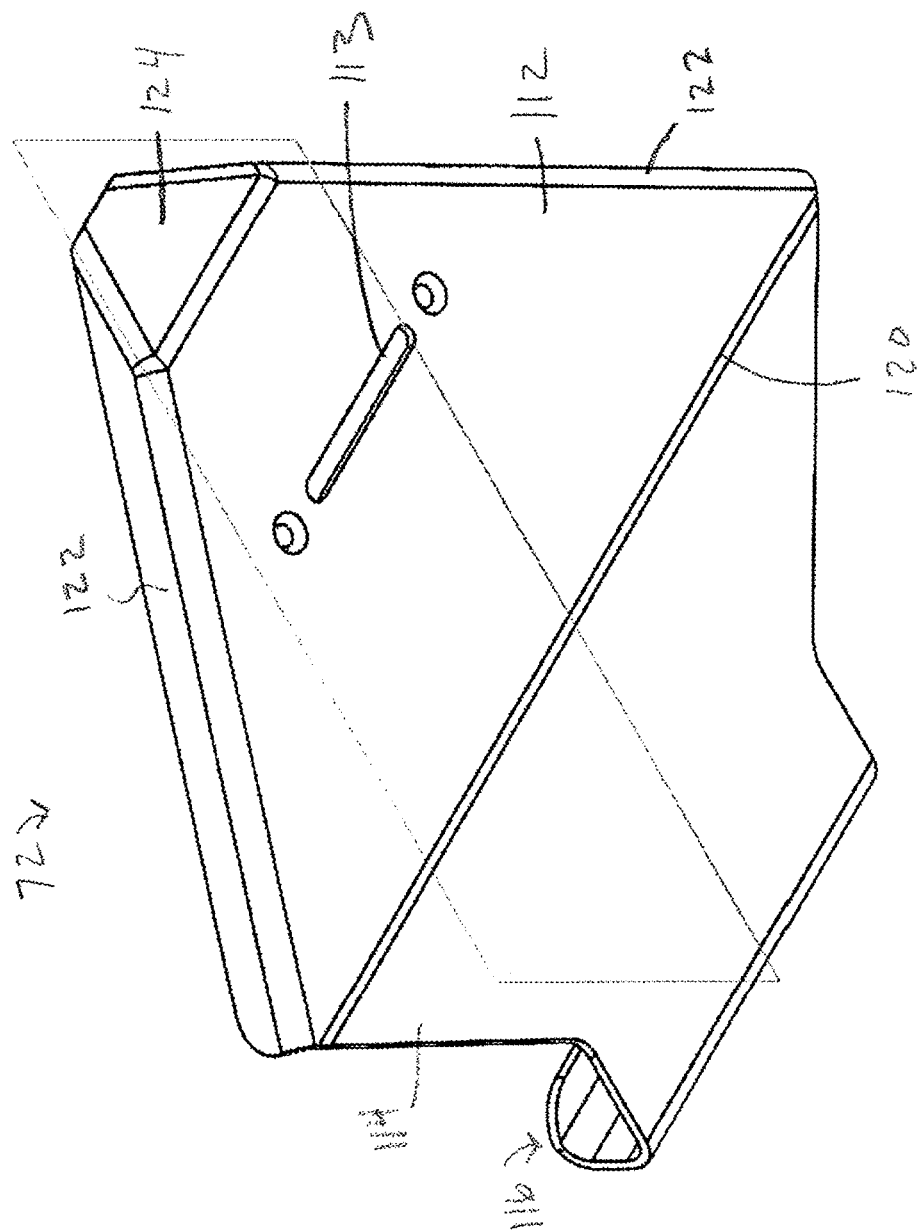
FIG. 11 is a second perspective view of the winch hook of FIG. 10.
Figure 12:
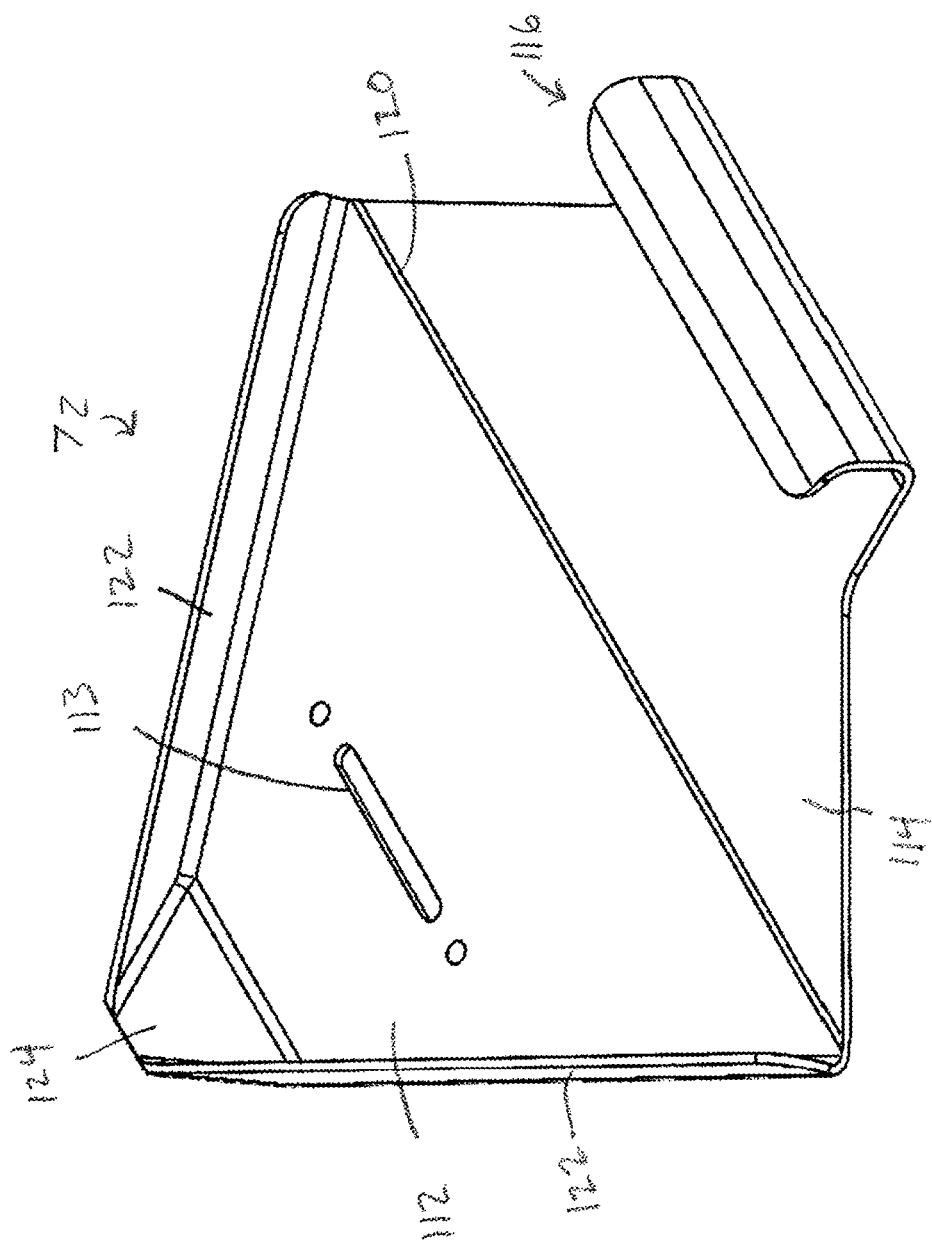
FIG. 12 is a third perspective view of the winch hook of FIG. 10.
Figure 13:
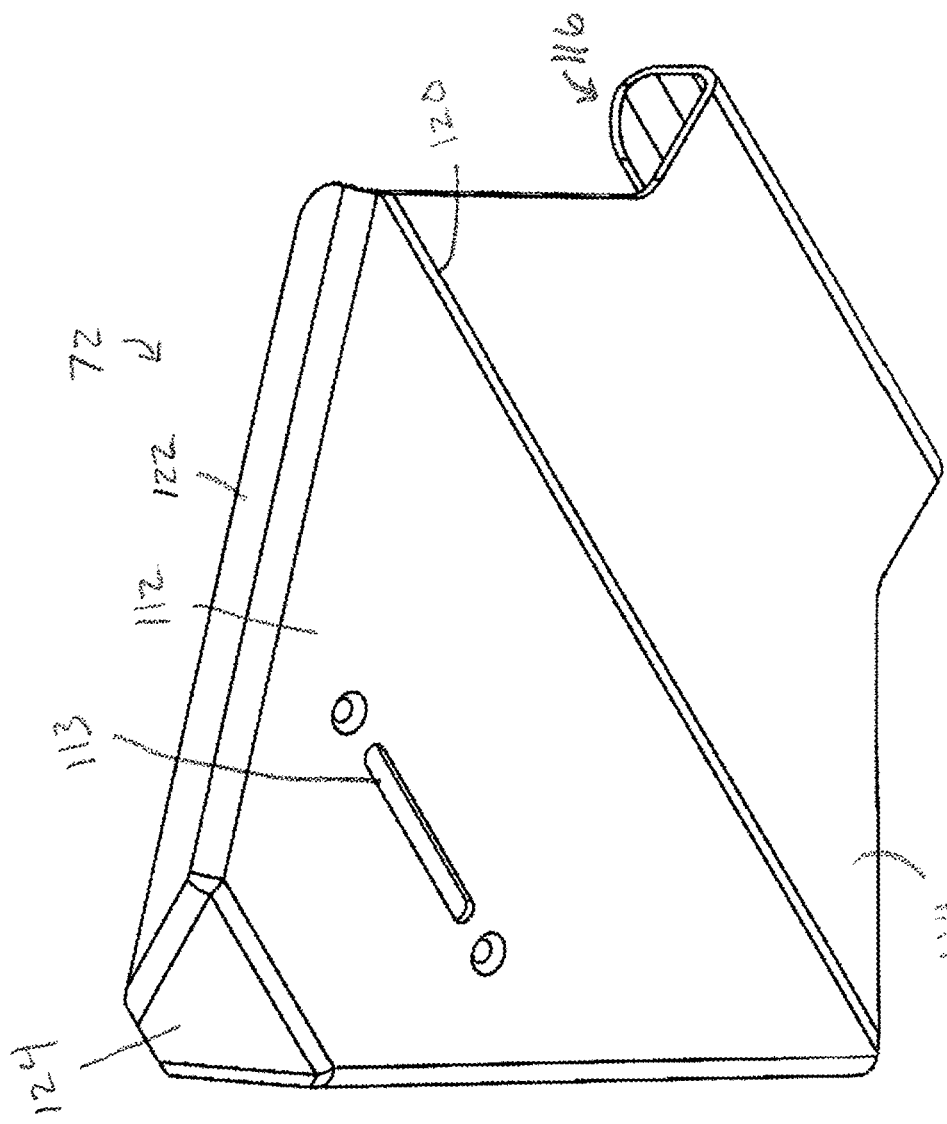
FIG. 13 is a fourth perspective view of the winch hook of FIG. 10.
Figure 14:
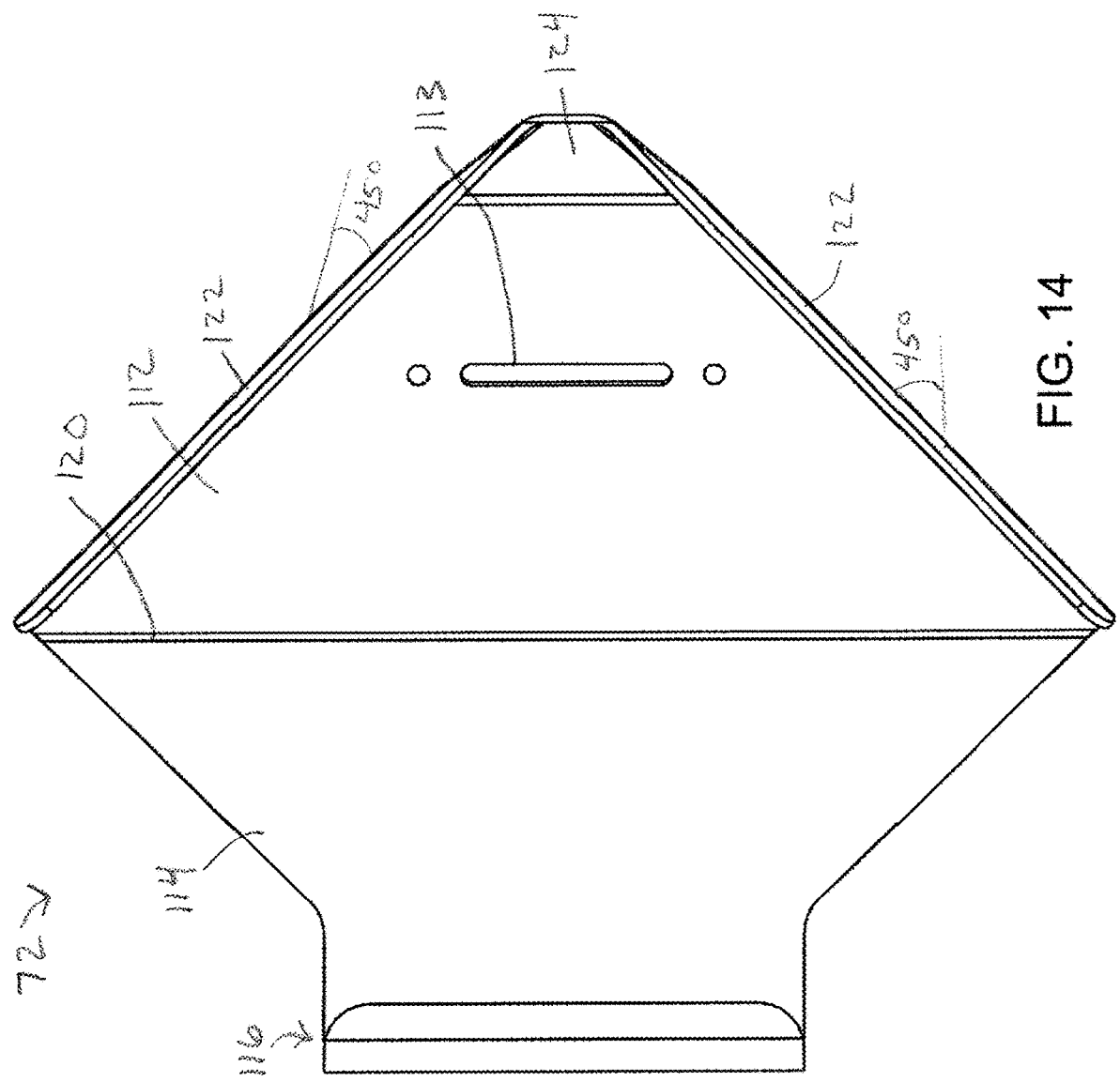
FIG. 14 is a top view of the winch hook of FIG. 10.
Figure 15:
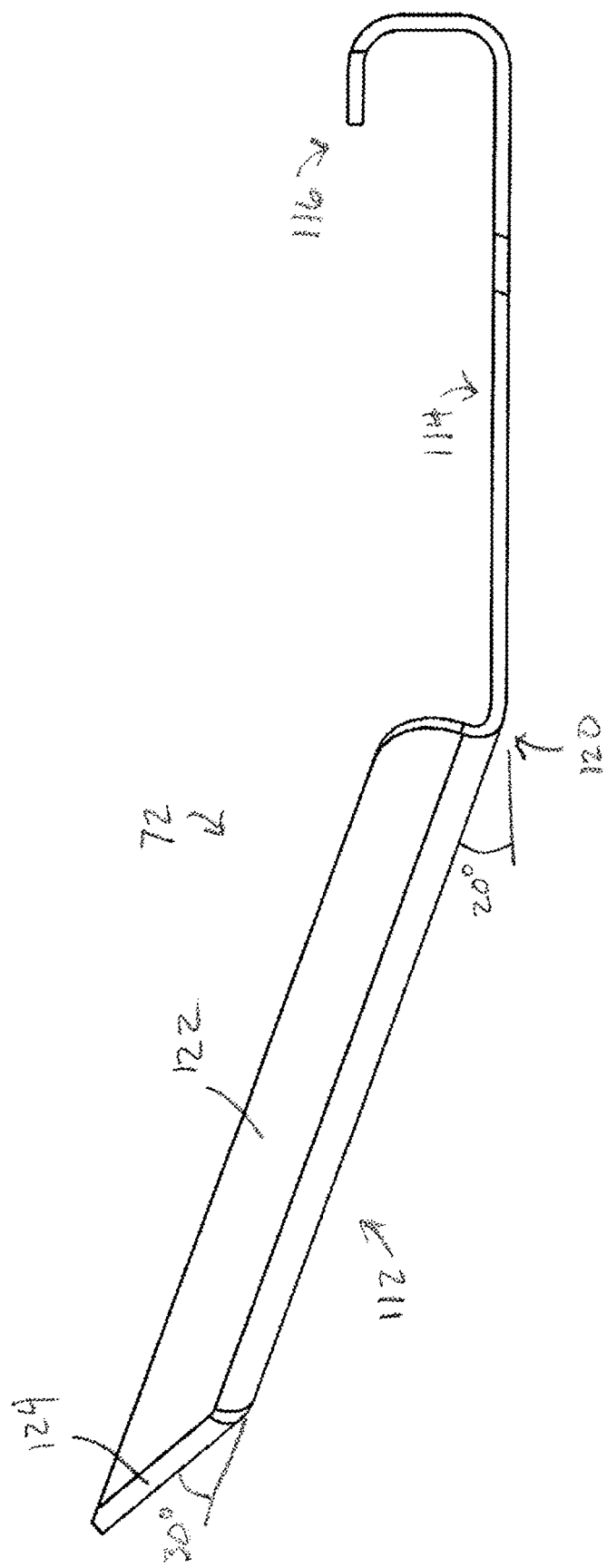
FIG. 15 is a plan view a right side of the winch hook of FIG. 10.
Figure 16:
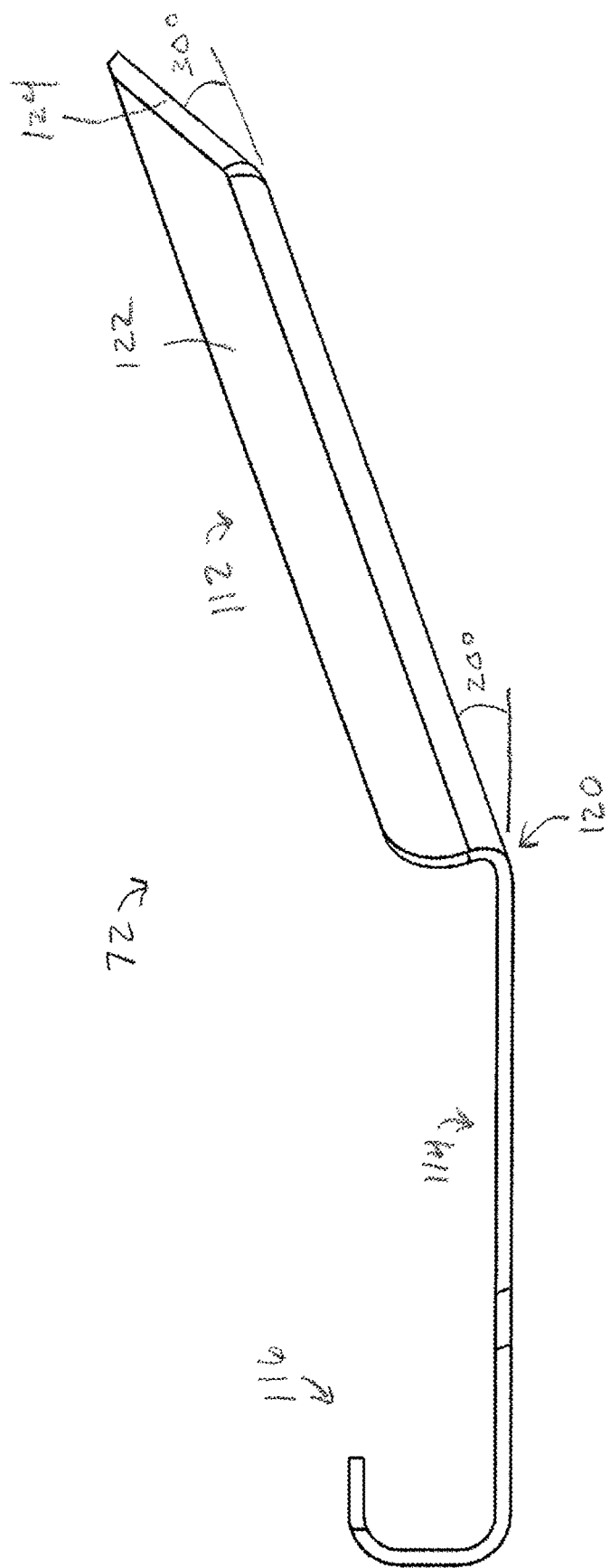
FIG. 16 is a plan view a left side of the winch hook of FIG. 10.
Figure 17:
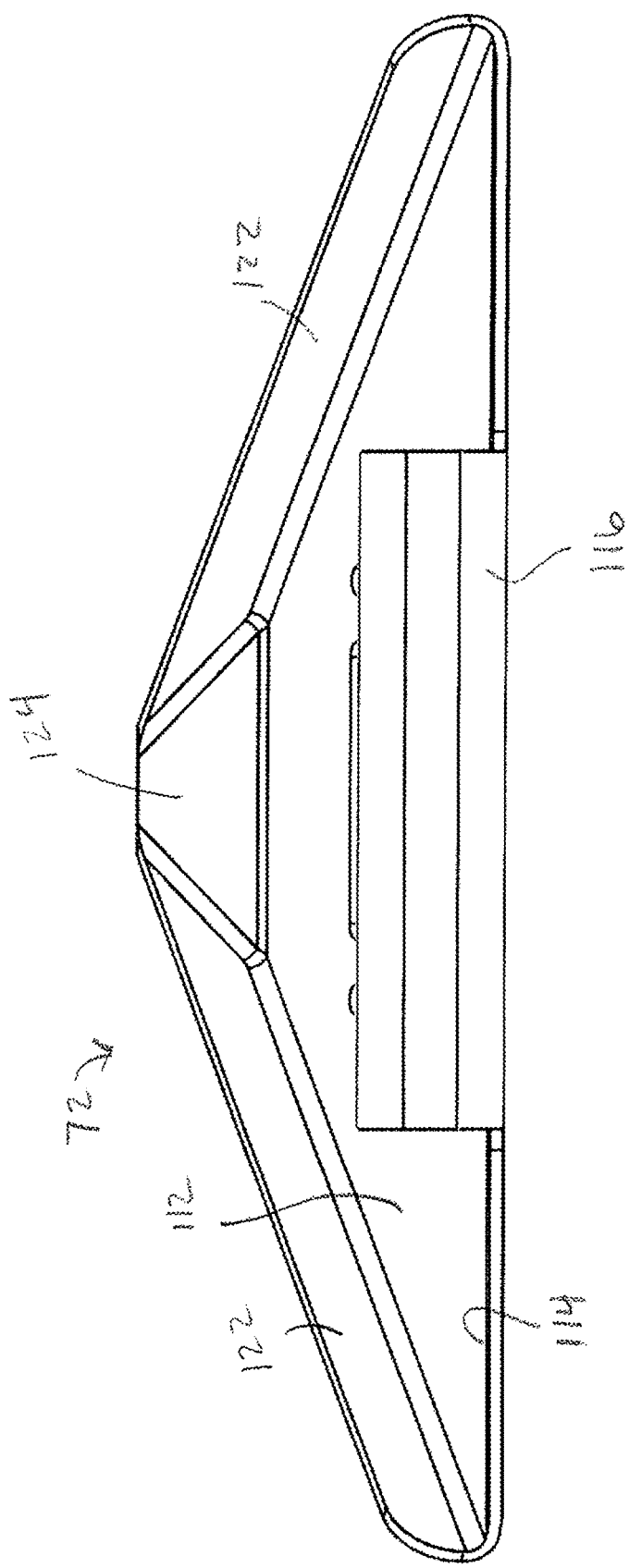
FIG. 17 is a front view of the winch hook of FIG. 10.
Figure 18:
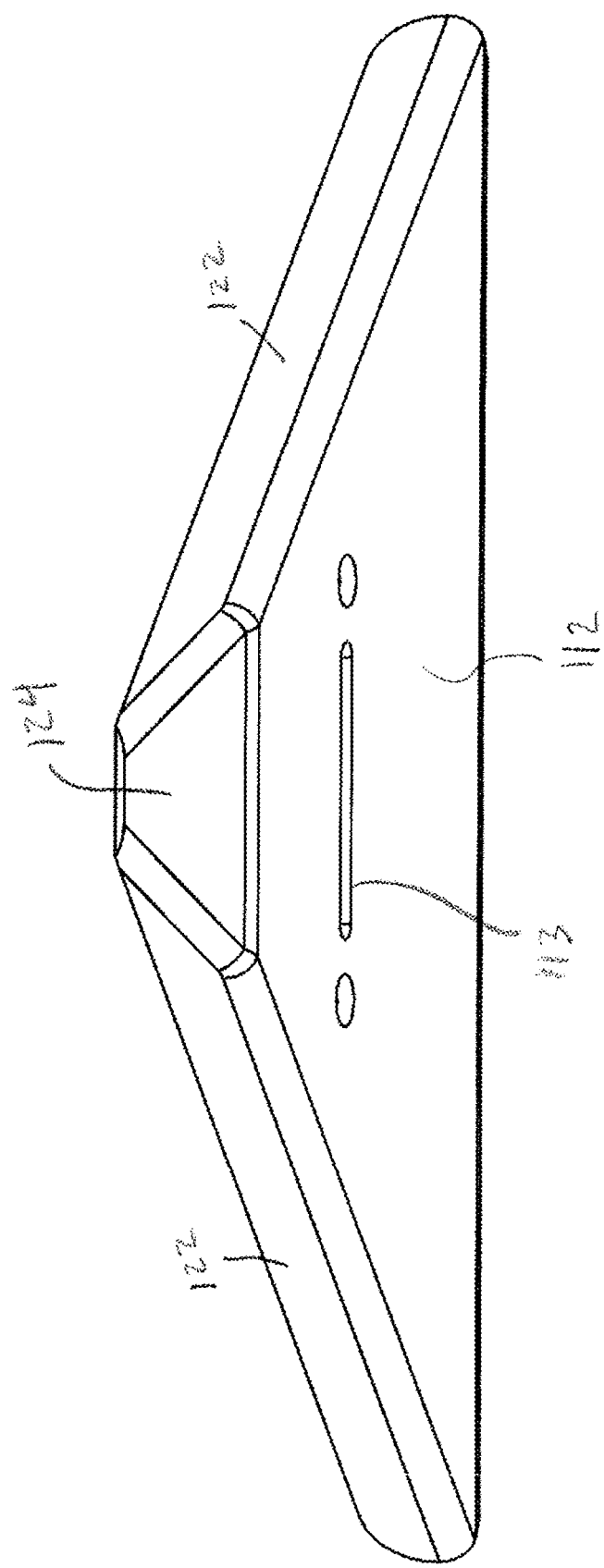
FIG. 18 is a back view of the winch hook of FIG. 10.

FIGS. 1-3: Rumble Strip Carrier

The rumble strip retrieval system 34 provided by the invention includes a known carrier, such as the rumble strip carrier 20 shown in FIGS. 1-3. The carrier 20 includes a frame 36 configured to receive and retain one or more, and typically multiple, portable rumble strips 22 for storage and transport. The frame 36 defines bottom, front, back, and lateral sides that form a basket. Specifically, the frame 36 includes frame members that define a bottom support surface 40, also referred to as a bottom side or bottom wall 40, on which the rumble strips 22 may be stacked. In other words, the bottom support surface 40 is configured to support one or more portable rumble strips 22 in the carrier 20.

The carrier 20 also includes upright front, back, and side walls 42, 44, 46 that extend upwardly from the support surface 40 in a common direction and bound at least two opposing sides of the support surface 40. The side walls 46 alternatively may be referred to as sides, ends, or end walls 46. The side walls 46 extend in a common upright direction transverse to, and generally in an upwardly direction from, the bottom wall that provides the rumble strip support surface 40.

Portable rumble strips 22 tend to be heavy, yet flexible. In prior practice, when initially loaded into the rumble strip carrier 20, typically a worker grabs a hand-hold 30 (FIG. 1) at one end of the rumble strip 22 and walks across the lane of roadway, pulling the rumble strip 22 over a proximal one of the end walls, unfolding the rumble strip sections and drawing the rumble strip 22 lengthwise over the side wall 46 and out of the carrier 20 for placement across a lane of the roadway.

Accordingly, the rumble strip carrier 20 may further include features that make it easier to withdraw or return rumble strips 22 over one or both of the opposing side walls 46. These features may include friction-reducing surfaces or one or more rotating members 50, such as rollers or bearings, as shown, that rotate about respective horizontal axes at the top of one or more of the side walls 46 to facilitate pulling a rumble strip 22 into or out of the carrier 20. In pulling a rumble strip 22 out of the carrier 20, gravity can assist once a sufficient weight of rumble strip 22 has been pulled over the side wall 46. In the illustrated embodiment, the rotating members 50 include a pair of spaced-apart rollers or bearings.

Providing rotating members 50 at both sides of the carrier 20 allows rumble strips 22 to be deployed over either side wall 46 across a roadway. If hinged rumble strips are used, the hinged portions should be pre-positioned on the proper side, such as adjacent the side wall 46 over which the rumble strip 22 is to be drawn, to unfold as the leading end of the rumble strip 22 is pulled from the carrier 20.

Another feature that facilitates drawing rumble strips 22 into or out of the carrier 20 includes a pair of upright guide wings 52 or fins that extend above one or both of the lateral sides 46 of the carrier 20. The guide wings 52 are spaced apart and are located toward the front and back walls 42, 44, respectively, adjacent the side wall 46 with end portions of the guide wings 52 angled outwardly, away from the opposing guide wing 52, to define a channel that helps to guide a rumble strip 22 over the side wall 46. The guide wings 52 also help to keep the rumble strip 22 in contact with the top of the side wall 46 as it is being withdrawn from the carrier 20 or returned to the carrier 20. The guide wings 52 further help to keep the rumble strips 22 aligned with the front and back walls 42, 44 of the carrier 20. When the guide wings 52 are used in conjunction with the rotating members 50, the guide wings 52 also help to keep the rumble strip 22 from sliding sideways off the top of the side wall 46 and out of contact with the rotating members 50. The guide wings 52 also make it easier to align the rumble strip carrier 20 with the location where the rumble strip 22 is to be deployed, and pulling the rumble strip 22 from the carrier 20 into the desired location helps to minimize the time needed for a worker to deploy or to retrieve the portable rumble strips 22 from a roadway.

The retrieval system 34 includes both the carrier 20 and a winch 54, as part of a winch assembly 56, that may be removably mounted to either of the end walls 46 of the carrier 20. A separate guide roller 60 may be removably mounted to an opposing end wall 46 of the carrier 20 to facilitate guiding a rumble strip 22 into or out of the carrier 20.

FIGS. 2-6: Winch Assembly

To do some of the work of lifting and moving a rumble strip onto the support surface 40 in the carrier 20, the retrieval system 34 provided by the present invention includes the winch 54, which is provided as part of a winch assembly 56. The winch assembly 56, described with reference to FIGS. 2-6, includes the winch 54 and a mounting bracket 62 that supports the winch 54 on the carrier 20. The mounting bracket 62, alternatively referred to as a mounting frame, is configured to engage portions of the carrier 20 to support the winch 54 relative to the carrier 20. More particularly, the winch 54 is interchangeably mountable to either of the upright side walls 46. The side wall to which the winch 54 is mounted will be referred to as the distal side wall, and the opposing side wall, over which a portable rumble strip is drawn, will be referred to as the proximal side wall. The winch 54 includes a motor 64, a rotatable drum 66 connected to the motor 64, and a lead 70 with a major dimension being a length dimension.

A proximal end of the lead 70 is connected to the drum 66 such that rotation of the drum 66 winds the lead 70 about the drum 66. The lead 70 may be a fabric strap, a rope, a cable, or other elongated member, configured to pull a rumble strip 22 (FIG. 1) onto the support surface 40 in the carrier 20 as the motor 64 drives the drum 66 to wind the lead 70 about the drum 66 as the drum 66 rotates. An exemplary lead 70 is a fabric strap having a length of about thirty feet (9.1 meters). A hook 72 is attached to a distal end of the lead 70 and will be described in further detail below.

Because the winch assembly 56 will be used in outdoor conditions, mounted to a vehicle, the motor 64 and the drum 66 are contained within a housing 74 for protection. The illustrated winch assembly 56 also includes a handle 76 to facilitate moving and positioning the winch 54 and the bracket 62 relative to the carrier 20.

The mounting bracket 62 includes a pair of upright frame members 80 that support the winch above a side wall of the carrier, and a cross member 82 with downward-opening, laterally-spaced mounting hooks 84. The mounting hooks 84 are configured to engage upper portions of the side walls 46, and are spaced apart to provide lateral stability. A bottom side of the upright frame members 80 are notched with mounting slots 86 or otherwise configured to engage frame members of the carrier 20 adjacent the rumble strip support surface 40 at the bottom wall of the carrier 20. Due to the symmetry of the carrier 20, the mounting bracket 62 allows the winch 54 to be supported on either of the side walls 46 of the carrier 20 with an outlet for the lead 70 facing inward, toward the opposing side wall 46.

The winch assembly 56 may further be provided with a controller having a processor, a memory, and programming instructions to be configured to control operation of the winch 54, and more particularly the motor 64, which is connected between a power supply 90 and the drum 66. The controller may be controlled with an input device, including wireless remote control 92 for operating the motor 64 remotely from the winch 54. The retrieval system 34 may include its own power supply 90 connectable to the winch 54, with necessary electrical cables and a battery 94 or other power pack and power control. The winch 54 alternatively may be powered through the electrical system of a vehicle, or the vehicle's electrical system may be used to recharge the retrieval system battery 94.

FIGS. 2-4, 7, and 8: Guide Roller Bracket

Referring now to FIGS. 2-4, 7 and 8, the carrier 20 may further include the guide roller 60 mountable to a proximate one or both the proximal and distal ones of the upright side walls 46. With the winch assembly 56 mounted to one side wall 46 of the carrier 20, referred to as the distal side wall 46, the guide roller bracket 60 is mounted to the opposite side wall 46, which will be referred to as the proximal side wall. While the side walls 46 of the illustrated carrier 20 include rollers 50, that may not be the case with every carrier. Moreover, the guide roller bracket 60 positions a cylindrical roller 102 spaced outward from and below an upper surface of the proximal side wall 46, which facilitates drawing the rumble strip from the ground and up and over the proximal side wall 46. The cylindrical guide roller 102 rotates about an axis and has a radius at a major extent of the cylindrical roller 102.

The roller bracket 60 includes a frame member 104 that is secured to the proximal side wall 46 with at least one fastener 106 configured to engage the upright side wall 46 of the carrier 20, such as with nuts and bolts or other fastening means. A single cylindrical guide roller 102 is supported by and extends between spaced-apart lateral portions of the frame member 104. Extensions from the lateral portions that extend further beyond the major extent of the cylindrical guide roller 102 form guide wings 110. The guide wings 110 are outwardly flared and extend away from the side wall 46 of the carrier 20 and angle outwardly from the lateral portions of the frame member 104 to guide the lead 70, the hook 72, and the portable rumble strip 22 over the cylindrical roller 102 and into the carrier 20, if necessary, such as when the length dimension of the rumble strip 20 is not perfectly aligned with the width dimension of the carrier 20.

The lateral portions of the frame member 104 are spaced further apart than the carrier guide wings 52, which allows the roller bracket guide wings 110 to be positioned adjacent to but outward from the carrier guide wings 52, and to cooperate with the carrier guide wings 52 to provide further guide surfaces for the lead 70 and the rumble strip 22 from the roadway into the carrier 20. The angled guide wings 110 are configured to minimize or prevent the lead 70 or the rumble strip 22 from catching on the roller bracket 60 or the proximal side wall 46 as the lead 70 and the rumble strip 22 are drawn over the guide roller 100 and into the carrier 20. For example, the guide wings 110 may be angled outwardly about forty-five degrees relative to the lateral portions that support the guide roller 100.

FIGS. 4 and 9-18: The Hook

As mentioned above, and referring now to FIGS. 4 and 9-18, the hook 72 is connected to a distal end of the lead 70 opposite the proximal end, and the hook 72 is configured to engage and hold a portable rumble strip 22 as the motor 64 rotates the drum 66 to draw the lead 70 and the hook 72 to the winch 54 and thereby draw a portable rumble strip 22 (FIG. 1) onto the support surface 40 of the carrier 20.

The hook 72 includes a proximal portion 112 to which the lead 70 is attached, such as via a hole or slot 113, and a distal portion 114 adjacent the proximal portion 112 that includes the curved portion 116 configured to engage the rumble strip 22, such as via receipt in the hand grip slot 30 (FIG. 1) of the rumble strip 22. The proximal portion 112 and the distal portion 114 are each generally planar, but are angled or inclined relative to one another by approximately twenty degrees at a joint line 120.

The joint line 120 is transverse a length dimension of the hook 72, along an extension of an axis of the lead. Put another way, the length dimension is the dimension of the hook 72 measured along a centerline from the proximal end to the distal end, from the lead-mounting slot 113 to the curved portion 116. The curved portion 116 may have a C-shape or U-shape cross section and may bend approximately 180 degrees. The hook 72 includes angled side edges on the proximal end portion 112 that are inclined relative to the length dimension of the lead, approximately 45 degrees on each side of the centerline, for example.

The hook 72 also includes side walls 122 along the angled edges that extend in a common direction, providing additional surface to engage the guide wings 110 of the guide roller bracket 100 or the side walls 46 of the carrier 20 without catching. A leading portion 124 at the proximal end also is angled approximately thirty degrees from the plane of the proximal portion 112 to further deflect direct the hook 72 over any obstructions as the hook 72 is pulled to the winch 54.

The present invention also provides a method of retrieving a portable rumble strip 22 from a roadway. The method includes the steps of (a) mounting a carrier 20 having a support surface 40 configured to support a portable rumble strip 22 to a vehicle; (b) mounting a winch 54 to the carrier 20, the winch 54 including a rotatable drum 66 and a lead 70 with a major dimension being a length dimension, a proximal end of the lead 70 being connected to the drum 66 such that rotation of the drum 66 winds the lead 70 about the drum 66, and a hook 72 connected to a distal end of the lead 70 opposite the proximal end; (c) extending the distal end of the lead 70 and the hook 72; (d) engaging a portable rumble strip 22 with the hook 72; and (e) retracting the lead 70 by rotating the drum 66 to wind the lead 70 about the drum 66, pulling the hook 72 and the engaged portable rumble strip 22 onto the support surface 40.

The engaging step may include engaging a portable rumble strip 22 having multiple segments along a length of the rumble strip, each segment connected to an adjacent segment by a hinge; and the method may further include the step of folding the portable rumble 22 strip over the proximal one of the upright side walls 46 of the carrier 20 after the retracting step.

The present invention further provides a system 34 for retrieving a portable rumble strip 22 from a roadway. The system 34 includes (a) means for supporting a portable rumble strip 22, the supporting means being mountable a vehicle; (b) means for pulling a portable rumble strip 22 onto the supporting means, the pulling means being mountable to the supporting means; and (c) means for engaging a portable rumble strip 22 connected to the pulling means to hold the engaged portable rumble strip 22 as the pulling means pulls the portable rumble strip 22 onto the supporting means.

Finally, the present invention also provides a new, original, and ornamental design for a winch hook 72, as shown in FIGS. 10-18.

In summary, the present invention provides a system 34 for retrieving a portable rumble strip 22 from a roadway that includes a carrier 20 mountable to a vehicle for transporting retrieved portable rumble strips 22 and a winch 54 mountable to the carrier 20. The carrier 20 has a support surface 40 configured to support a rumble strip 22. And the winch 54 includes a rotatable drum 66 and a lead 70 with a major dimension being a length dimension. A proximal end of the lead 70 is connected to the drum 66 such that rotation of the drum 66 winds the lead 70 about the drum 66. A hook 72 is connected to a distal end of the lead 70 opposite the proximal end. The hook 72 is configured to engage and hold a portable rumble strip 22 as the drum 66 rotates to draw the lead 70 and the hook 72 to the winch 54, thereby drawing the engaged portable rumble strip 22 into the carrier 20.

Although the invention has been shown and described with respect to a certain embodiment, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function of the herein illustrated exemplary embodiments of the invention. In addition, while a particular feature of the invention may have been disclosed with respect to only one embodiment, such feature may be combined with one or more other features as may be desired or advantageous to any given or particular application.

The invention claimed is:

1. A system for retrieving a portable rumble strip from a roadway, comprising:
   a carrier mountable to a vehicle for transporting retrieved portable rumble strips, the carrier having a support surface configured to support a rumble strip;
   a winch mountable to the carrier, the winch including a rotatable drum and a lead with a major dimension being a length dimension, a proximal end of the lead being connected to the drum such that rotation of the drum winds the lead about the drum; and
   a hook connected to a distal end of the lead opposite the proximal end, the hook being configured to engage and hold a portable rumble strip as the drum rotates to draw the lead and the hook to the winch;
   wherein the hook includes a curved portion at the distal end configured to engage the portable rumble strip and is connected to the lead at a proximal end of the hook opposite the distal end, the hook having a length dimension extending from the distal end to the proximal end, and a width dimension transverse the length dimension,
   the hook having an intermediate portion between the proximal end and the distal end with a width dimension that is greater than a width dimension of the curved portion, the hook having angled edges that are inclined relative to the length dimension between the intermediate portion and the curved portion, and the proximal portion and the distal portion are inclined relative to one another at a joint line transverse the length dimension of the hook.

2. A system for retrieving a portable rumble strip from a roadway, comprising:
   a carrier mountable to a vehicle for transporting retrieved portable rumble strips, the carrier having a support surface configured to support a rumble strip;
   a winch mountable to the carrier, the winch including a rotatable drum and a lead with a major dimension being a length dimension, a proximal end of the lead being connected to the drum such that rotation of the drum winds the lead about the drum; and
   a hook connected to a distal end of the lead opposite the proximal end, the hook being configured to engage and hold a portable rumble strip as the drum rotates to draw the lead and the hook to the winch,
   wherein the hook includes angled edges on the proximal end that are inclined relative to the length dimension of the lead, and wherein the hook includes upright side walls along the angled edges.

3. The system of claim 1 further comprising a power supply connectable to the winch, and a motor connected between the power supply and the drum.

4. The system of claim 1 further comprising a controller for controlling the winch.

5. The system of claim 4, wherein the controller may be operated remotely relative to the winch.

6. The system of claim 1, where the carrier has upright side walls bounding at least two opposing sides of the support surface, and a guide roller mountable to a proximate one of the upright side walls.

7. The system of claim 6, wherein the guide roller includes a cylindrical roller that is rotatable about an axis and has a radius at a major extent of the cylindrical roller and has laterally spaced guide walls extending beyond the major extent of the cylindrical roller to guide the lead, the hook, and the portable rumble strip over the cylindrical roller and into the carrier.

8. The system of claim 6, wherein the guide roller includes a single cylindrical roller.

9. The system of claim 7, wherein the guide walls include outwardly flared portions and the cylindrical roller is interposed between the outwardly flared portions and the carrier.

10. The system of claim 8, wherein the guide roller includes a mounting frame configured to engage portions of the carrier to support the cylindrical roller relative to the carrier.

11. The system of claim 10, wherein the mounting frame for the guide roller includes at least one fastener configured to engage an upright side wall of the carrier.

12. The system of claim 1, wherein the winch includes a mounting frame configured to engage portions of the carrier to support the winch relative to the carrier.

13. The system of claim 12, wherein the mounting frame for the winch includes at least one hook configured to engage an upright side wall of the carrier.

14. The system of claim 1, wherein the hook includes upright side walls along angled edges between the proximal end and the intermediate portion.

15. The system of claim 1, wherein the hook is made of a sheet material having a thickness dimension that is much smaller than the width dimension or the length dimension.

\* \* \* \* \*